United States Patent
Zhang et al.

(10) Patent No.: US 9,007,484 B2
(45) Date of Patent: Apr. 14, 2015

(54) ALLEVIATING DOMINANT COLOR FAILURE IN AUTOMATIC WHITE BALANCE USING HISTOGRAM TRIMMING

(75) Inventors: Xuemei Zhang, Mountain View, CA (US); Yingjun Bai, San Jose, CA (US); Paul Hubel, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 236 days.

(21) Appl. No.: 13/349,090

(22) Filed: Jan. 12, 2012

(65) Prior Publication Data

US 2013/0093917 A1 Apr. 18, 2013

Related U.S. Application Data

(60) Provisional application No. 61/546,143, filed on Oct. 12, 2011.

(51) Int. Cl.
*H04N 9/73* (2006.01)
*H04N 1/60* (2006.01)

(52) U.S. Cl.
CPC ............... *H04N 9/73* (2013.01); *H04N 1/6041* (2013.01)

(58) Field of Classification Search
CPC ....................................................... H04N 1/6041
USPC ............................... 382/162, 163, 165; 707/3
See application file for complete search history.

(56) References Cited

U.S. PATENT DOCUMENTS

| | | | | |
|---|---|---|---|---|
| 2003/0194125 A1* | 10/2003 | Hubel et al. | ................ | 382/162 |
| 2003/0194127 A1* | 10/2003 | Hubel et al. | ................ | 382/165 |
| 2004/0236733 A1* | 11/2004 | Hung | ................ | 707/3 |
| 2008/0069440 A1* | 3/2008 | Forutanpour | ................ | 382/163 |

* cited by examiner

*Primary Examiner* — Roberto Velez
*Assistant Examiner* — Stephen Coleman
(74) *Attorney, Agent, or Firm* — Wong, Cabello, Lutsch, Rutherford & Brucculeri, LLP

(57) ABSTRACT

Methods, devices and computer readable media for implementing novel dominant color alleviation techniques for color balancing are described. The techniques take advantage of unique properties of 2D image data histograms accumulated in a chromaticity space, along with other factors such as estimated scene lux and knowledge of plausible scene illuminant white point values within the chromaticity space. The accumulated 2D image data histograms may be refined and "trimmed," such that the resultant image data passed to an auto white balance solution has much less influence from the dominant colors in the image, even those that overlap the plausible scene illuminant color region. The described techniques provide for white point estimates that are much less prone to dominant color failures.

23 Claims, 7 Drawing Sheets

ALLEVIATING DOMINANT COLOR FAILURE IN AUTOMATIC WHITE BALANCE USING HISTOGRAM TRIMMING

CROSS-REFERENCE TO RELATED APPLICATION

This application claims priority U.S. Provisional Patent Application Ser. No. 61/546,143, filed Oct. 12, 2011, which is hereby incorporated by reference in its entirety.

BACKGROUND

This disclosure relates generally to the field of color balancing. More particularly, but not by way of limitation, it relates to techniques for alleviating problems associated with dominant color failures in auto white balance (AWB) algorithms.

Color balancing may be thought of as the global adjustment of the intensities of the colors in an image. One goal of color balancing is to render specific colors, e.g., neutral white, as accurately as possible to the way the color appeared in the actual physical scene from which the image was captured. In the case of rendering neutral white colors correctly, the process is often referred to as "white balancing," Most digital cameras base their color balancing and color correction decisions at least in part on the type of scene illuminant. For example, the color of a white sheet of paper will appear differently under fluorescent lighting than it will in direct sunlight. The type of color correction to be performed may be specified manually by a user of the digital camera who knows the scene illuminant for the captured image, or may be set programmatically using one or more of a variety of AWB algorithms.

Dominant color failure is a common problem in AWB algorithms that use image pixel information to estimate the white point of the scene. The light signal received by each image sensor pixel is a product of the scene illuminant and the reflectance spectra of the object surfaces in the scene, so it is difficult to isolate the illuminant color from surface color based on the pixel values. Most white balance algorithms make assumptions about the statistical distributions of object surface reflectance in the real world, as well as assuming a reasonably diverse number of different surfaces in the scene, to help resolve the ambiguity of surface and illuminant colors.

As an example, the so-called "gray world" AWB algorithm assumes that the all of the surfaces in a scene average out to gray (e.g., an 18% gray value), and therefore, by averaging all pixel colors of an image, a reasonable estimate of the white point of the scene may be calculated. In some other white balance algorithms, referred to as "selective gray world" algorithms, pixel colors that are not possible responses of a white surface under any practical illuminant are excluded first, and then the rest of the pixels values in the scene are averaged to form a scene white point estimate, again assuming that the surfaces should average out to gray. Other more sophisticated assumptions/models about surface reflectance distribution can be made (and have been done), to improve white balance accuracy above simple gray world or selective gray world algorithms.

However, almost all AWB algorithms have difficulty when the image is dominated by a single-colored surface. In such a case, the so-called dominant color can seriously bias the white point estimate. White balance is especially difficult in cases where the dominant color, when placed under the scene illuminant, gives off a light signal that is similar to what an actual white surface would give off under a different type of scene illuminant. For example, the color of light wood or hay in cool daylight gives a range of pixel responses (due to texture and lighting angle variation), some of which are the same as a white surface under warm tungsten light (e.g., an incandescent light bulb). Similarly, the pixel responses of grass under dusk daylight may have large overlap with pixel values of gray surfaces under some compact fluorescent lights. In these cases, a large portion of the colored surfaces' pixel response cannot safely be excluded when calculating white balance statistics since such values may fall within a range corresponding to proper white points for true illuminants.

Such ambiguity might be better resolved if there are other surfaces in the scene, but when other surfaces are scarce or absent, white balance error can become quite large. For example, an image that is dominated by a light-greenish color, such as a close up on a bunch of green grapes, many of the light-greenish pixel values dominating the image may overlap in chromaticity with the color of a white surface under some fluorescent illuminants. In other words, the AWB process may not be able to distinguish from a bowl of light-greenish grapes in daylight and a piece of white paper illuminated by a greenish fluorescent light, and thus would attempt to color balance the two images in the same way, even though such an approach would not make the grapes render accurately. That is, the white point estimate produced from a weighted sum of all pixel values in the "plausible white" zone for the bowl of grapes image would likely be biased toward a greenish-yellow color, resulting in an over-corrected white balanced image that is too purplish.

Accordingly, there is a need for techniques to provide more accurate white balancing in images dominated by one or more non-white colors. By strategically trimming a two-dimensional (2D) histogram representative of the image data based on factors such as estimated scene lux and typical scene illuminant white point values, white points can be calculated more accurately, while the influence of dominant image colors on scene white point determination can be minimized.

SUMMARY

This disclosure pertains to devices and computer readable media for implementing novel dominant color alleviation techniques for color balancing. The techniques described herein take advantage of unique properties of 2D image data histograms accumulated in a chromaticity space, along with other factors, such as estimated scene lux and knowledge of plausible scene illuminant white point values within the chromaticity space. The 2D image data histograms accumulated in the chromaticity space may be refined and "trimmed," such that the resultant image data passed to an AWB solution has much less influence from the dominant colors in the image, even those that have overlap with the plausible scene illuminant color region. Using these techniques provides for white point estimates that are much less prone to dominant color failures.

If pixel responses for the dominant color surfaces in an image are exactly the same as white/gray surfaces under any of the common scene illuminants, then there is no effective way to separate the two classes of pixels (i.e., dominant color pixels and actual white/gray surface pixels) with only image pixel information. In the majority of dominant color failure cases, however, the dominant color pixel responses are not exactly identical to common illuminant colors. A significant portion of the dominant color response may overlap the illuminant color range, but there is almost always a portion of the dominant color that is outside the illuminant color range (please refer to 2D histogram plots in FIGS. 5 and 6, as well as the accompanying explanations provided herein). This partial non-overlap with the common illuminant color range provides valuable information that may be used to identify and remove pixel responses from colored surfaces, even if they fall within the common illuminant color range.

More specifically, analyzing the amount of non-overlap of a colored surface with the common illuminant range in the color space and applying an estimated noise model for the image sensor can provide a rough estimate of how much influence the colored surface values outside the common illuminant range have had on the statistics of the pixel values actually falling within the common illuminant range. This estimated influence on the pixels falling within the common illuminant range may then be subtracted out from the pixel values sent to an AWB algorithm in order to provide for a more accurate white point estimate that is less affected by colored surfaces, especially dominant colored surfaces with color values falling inside or near the common illuminant region.

Thus, in one embodiment described herein, a computer-implemented method is disclosed comprising: storing image pixel data in a memory, wherein the image pixel data is obtained from an image sensor; transforming the image pixel data into an image histogram of values over a color space, wherein the values correspond to a distribution of the image pixel data in the color space; creating a non-white histogram of values over the color space by identifying non-white pixel values in the image histogram; creating a blurred non-white histogram of values over the color space by blurring the non-white histogram; subtracting the blurred non-white histogram from the image histogram to create a trimmed histogram of values over the color space; and storing the trimmed histogram of values in the memory.

The trimmed histogram values may then be used to calculate a more accurate scene white point for the image that is less susceptible to the influence of colored surfaces in the image. The image may then be color corrected based on the more accurately calculated scene white point.

Novel and improved dominant color failure alleviation techniques for AWB in accordance with the various embodiments described herein may be implemented directly by a device's hardware and/or software, thus making these robust image processing techniques readily applicable to any number of electronic image capture devices with appropriate image sensors, such as mobile phones, personal data assistants (PDAs), portable music players, digital cameras, as well as laptop and tablet computer systems.

DETAILED DESCRIPTION

Methods, devices and computer readable media for implementing novel dominant color alleviation techniques for color balancing are described. The techniques take advantage of unique properties of 2D image data histograms accumulated in a chromaticity space, along with other factors such as estimated scene lux and knowledge of plausible scene illuminant white point values within the chromaticity space. The accumulated 2D image data histograms may be refined and "trimmed," such that the resultant image data passed to an auto white balance solution has much less influence from the dominant colors in the image, even those that overlap the plausible scene illuminant color region. The described techniques provide for white point estimates that are much less prone to dominant color failures.

In the interest of clarity, not all features of an actual implementation are described in this specification. It will of course be appreciated that in the development of any such actual implementation (as in any development project), numerous decisions must be made to achieve the developers' specific goals (e.g., compliance with system- and business-related constraints), and that these goals will vary from one implementation to another. It will be further appreciated that such development effort might be complex and time-consuming, but would nevertheless be a routine undertaking for those of ordinary skill having the benefit of this disclosure.

In the following description, for purposes of explanation, numerous specific details are set forth in order to provide a thorough understanding of the inventive concept. As part of the description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1A:
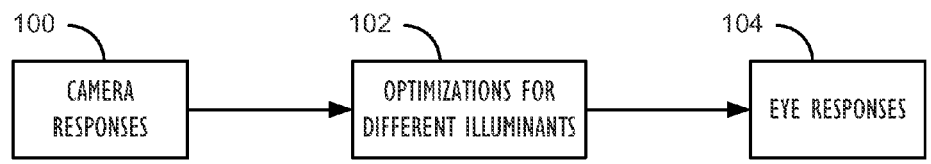
FIG. 1A illustrates a perceptual model for correcting camera response to the sensitivity of the human eye.

Turning first to FIG. 1A, a perceptual model for correcting camera response to the sensitivity of the human eye is shown for explanatory purposes. At basic level, a camera's image sensor will have characteristic responses 100 to incident light across the entire spectrum of wavelengths to which the image sensor is sensitive. The scene being captured may also be lit by different types of illuminants, which can have an effect on the way that the colors in the scene will be reproduced and perceived by the human eye. Thus, different optimizations 102, such as color balancing, may be employed based on different illuminant types.

If the image sensor's sensitivity is the same as the sensitivity of the human eye across the visible ranges of the human eye, then no further color correction beyond color balancing may be needed; however, if the image sensor's sensitivity and the sensitivity of the human eye are different across the particular range of human vision, then further color correction, such as the application of a color correction matrix (CCM) may also be employed to the image sensor captured data to ensure the perception of the color by the human eye 104 is as accurate as possible to the real-world scene color.

Figure 1B:
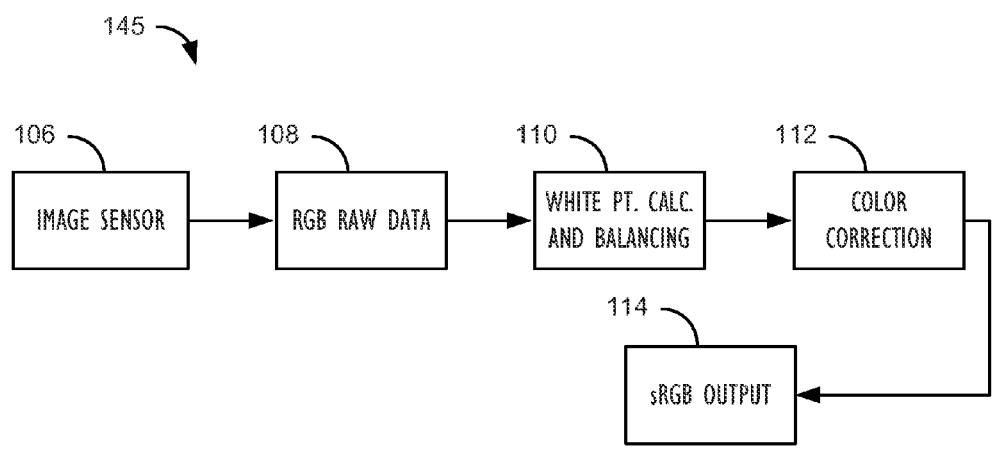
FIG. 1B illustrates an abstractive and conceptual image processing pipeline for performing color correction.

Turning now to FIG. 1B, an abstractive and conceptual image processing pipeline 145 for performing color correction is shown for explanatory purposes. First, the scene is captured by an image sensor 106. Data is output from the image sensor in RGB raw data format 108. Next, scene white point is calculated and a white balance algorithm is run over the captured image sensor data 110 to determine if the gains of any of the R, G, or B channels need to be adjusted so that a white pixel renders as white. Any of a number of possible white balance algorithms may be used, such a gray world algorithm, selective gray world algorithm, or weighted accumulator algorithm. Next, depending on the type of illuminant, further color correction 112, for example, a CCM, may be applied to the image data. The values in a CCM may be a function of both the scene white point and the scene lux level. Therefore, two images with the same white point could have very different CCMs. Once the image data has been color balanced and color corrected as desired, output data, e.g., in the form of sRGB (i.e., standard RGB), may be sent to a desired display device 114.

With this framework in mind, the remainder of the Detailed Description will discuss techniques that may be used and applied to the raw pixel data coming out of element 108 so that the white point calculation and color balance process 110 will be more effective. Specifically, the techniques discussed herein will relate to image processing techniques for alleviating dominant color failures during white balancing.

Various schemes have been devised to deal with the dominant color problem. As one example, the weight of dominant colors can be reduced when compiling the image pixel statistics used for white balance. Another exemplary scheme may attempt to cluster highly similar colors, and then weight each cluster equally, regardless of the number of pixels within each color cluster. However, if the scene is dominated by a white surface with only a small colored region, the white balance error would be made worse by a clustering scheme. This type of white balance error is undesirable since it is counter-intuitive and puzzling to users. Another dominant color alleviation scheme may look at patterns of the presence or absence of colors instead of using a cumulative statistics for white point estimate. However, such methods typically rely on having a diverse number of surfaces in the scene and do not improve the determination of a white point in cases where only a few surfaces are present in the scene. While it may be nearly impossible to completely eliminate all dominant color bias in white balance, the techniques disclosed herein provide a solution that alleviates the problem to a degree that, for most images, dominant color failures are not so large as to be visually objectionable in the corrected image.

Figure 2:
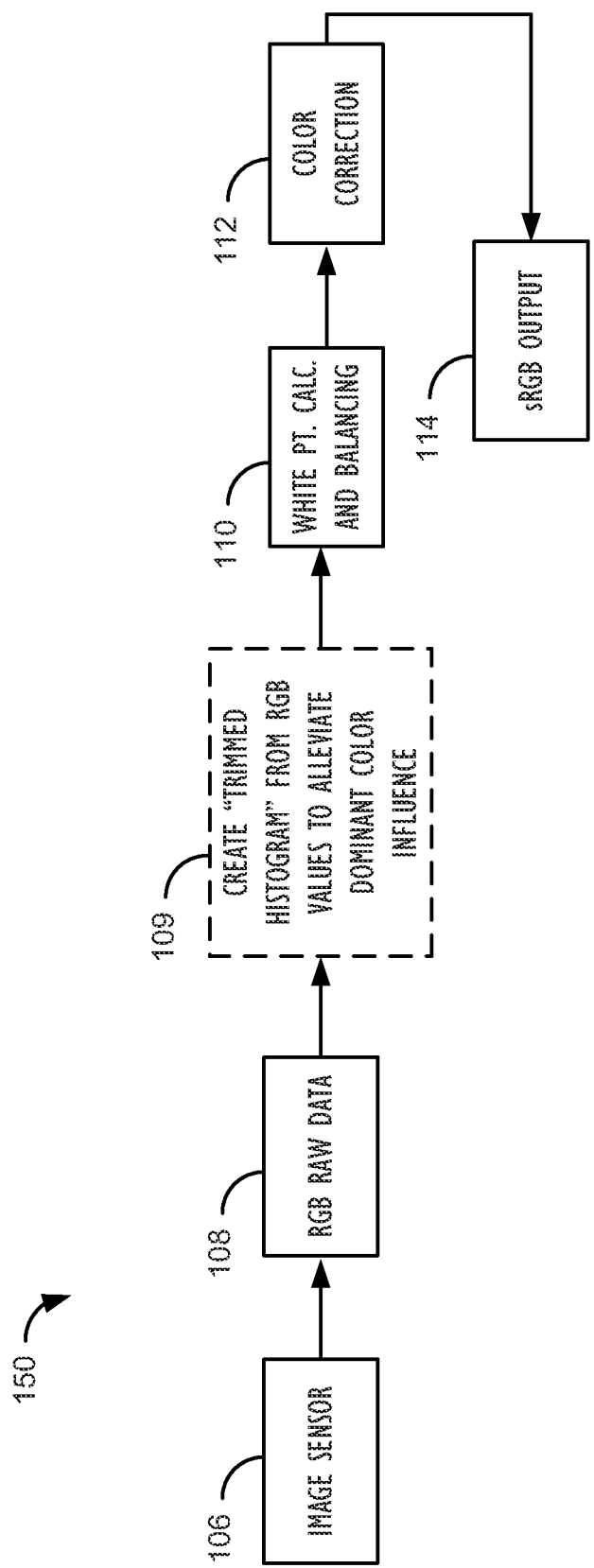
FIG. 2 illustrates an improved image processing pipeline for performing color balancing and correction utilizing a trimmed image histogram, in accordance with one embodiment.

Turning now to FIG. 2, an improved image processing pipeline 150 for performing color correction utilizing a trimmed histogram is shown, in accordance with one embodiment. Compared to image processing pipeline 145 shown in FIG. 1B, the improved image processing pipeline 150 has an element 109 labeled "Create 'Trimmed Histogram' from RGB values to alleviate dominant color influence" between the receiving of raw data at element 108 and the performance of white point calculation and color balancing at element 110. The transformations of raw pixel data into the trimmed histogram 109 will now be described in further detail below.

According to some embodiments, the color space, or "chromaticity space," in which the image pixel chroma data histogram is accumulated may be defined by a series of mathematical transformations in order to give the space a particular shape or to result in other desired properties being enforced. Additionally, the transformation parameters may be optimized to adapt to specific sensors' spectral sensitivity. In the example described below, the chromaticity space will be an affine-transformed log ratio color space, but any other color space may be used, such a color ratio space (e.g., R/G by B/G).

Constructing the "Trimmed Histogram"

Figure 3:
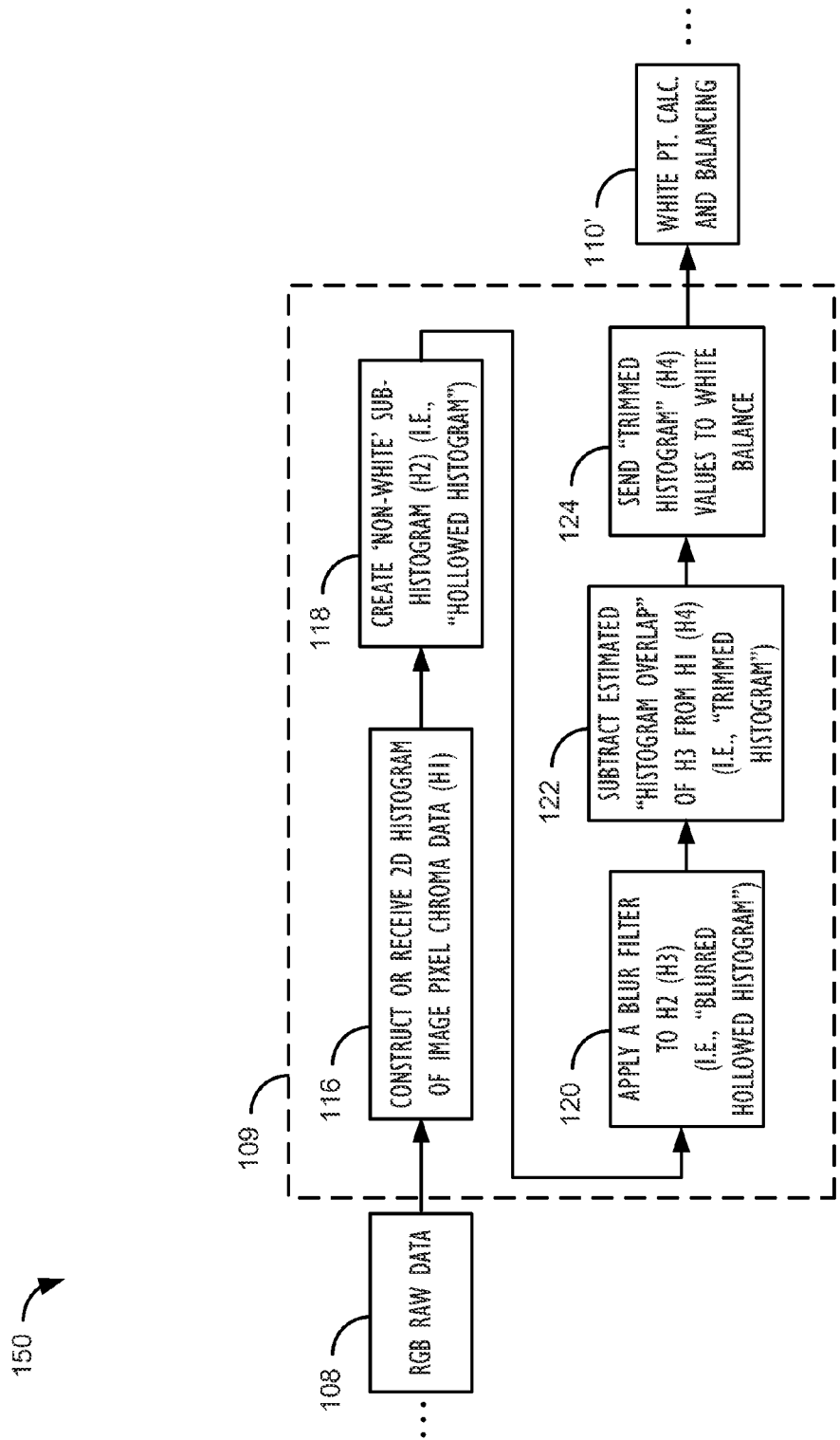
FIG. 3 illustrates, in greater detail, a process for creating a trimmed image histogram, in accordance with one embodiment.

As mentioned above, image sensor information may come into the image processing pipeline 150 from the image sensor in the form of RGB raw data, an unprocessed linear RGB signal that is not ready for display. Turning now to FIG. 3, the process flow 109 for creating a "trimmed histogram" of image pixel data is shown in greater detail.

In order to reduce the input signal from three color dimensions (i.e., red, green, and blue) into two color dimensions, the RGB signal may be converted into chrominance values. Chrominance, as used herein, will refer to an objective specification of the quality of a color—independent of its luminance (i.e., brightness). Once luminance has been removed from consideration, the remaining components of a color can be defined by two variables, sometimes referred to as x and y. This is useful, as it allows the chromaticity space to be mapped into a 2D plot where all existing colors may be uniquely identified by an x-y coordinate position in the chromaticity space. These chrominance values may then be accumulated in a 2D histogram created over the color space (Element 116). The histogram of color values may either be received at the process flow 109 (i.e., constructed by some external process) or may be constructed within process flow 109.

Choice of the color space for the histogram can potentially affect the efficiency of the trimmed histogram creation process. In some embodiments, a desirable color space is one where the noise distribution of each color is nearly identical across all locations in the color space. This allows the process to use the same filter kernel for all locations in the histogram later in the histogram trimming process. The histogram trimming operation can be further simplified to x-y separable filtering if the noise distribution is x-y separable in this space. In such a case, the 2D filtering operation may be done as two distinct one-dimensional filtering operations, thus greatly reducing the amount of computation required. The choice of color space in which histogram is constructed affects whether the noise distribution is x-y separable or not. For the purposes of this disclosure, this initial 2D histogram of image pixel data will be referred to as H1.

Next, the process may create a "non-white" sub-histogram, which will be referred to herein as H2, by replicating the 2D image pixel histogram, H1, and then setting all entries within the region of illuminant colors to zero (Element 118). The region of illuminant colors may, for example, be defined as a binary mask on the histogram (see element 162 in FIGS. 5 and 6), or as a convex polygon encompassing common illuminants white points. This "common illuminant" mask or polygon is often defined as part of the AWB algorithm's parameters, as it is used to decide what pixel colors are included in calculating the white point. In this way, the histogram trimming process may make use of the mask or polygon that has already been defined for AWB. This "non-white" sub-histogram, H2, will then represent all pixel colors outside of the common illuminant color zone, i.e., colors that are unlikely to be from a white/gray surface.

The next step in FIG. 3 is Element 120, "Apply a blur filter to H2." This blurring process will create a resultant histogram that will be referred to herein as the "blurred hollowed histogram," or simply, H3. H3 is referred to as "hollowed" because pixel values falling within the boundary of the common illuminant zone have been zeroed out (i.e., set to zero in the histogram), and it is referred to as "blurred" because the remaining histogram values will have been blurred by a suitable filter kernel, as will be discussed in further detail below.

The step of applying a blurring filter, F, on histogram H2, to create a blurred hollowed sub-histogram, H3, may be represented by the following equation:

$$H3 = F(H2, n) \quad \text{(Eqn. 1).}$$

In some embodiments, the filter kernel for blur filter, F, may have a shape similar to the noise distribution of pixel colors in the color space. The kernel size may also be determined based on an estimated image noise level, n, so that the aggressiveness of histogram trimming can be tuned to specific scene light levels. Using the pixel colors outside of illuminant color region and the noise distribution information in this way allows the process make an informed estimate of how much any dominant color distribution may have "eaten into" the illuminant color region on the histogram, i.e., how much the dominant color may have influenced the white point statistics.

The next step in FIG. 3 is Element 122, "Subtract estimated 'histogram overlap' of H3 from H1." This subtraction process will create a resultant histogram that will be referred to herein as the "trimmed histogram," or simply, H4. In general, operations between two histograms of the same size will operate on corresponding elements of the histograms. H4 is referred to as "trimmed" because, at this point, dominant colors falling outside of the common illuminant zone, as well as some portion of dominant color pixels falling within the common illuminant zone will have been excised from the image histogram data. This step of subtracting the estimated "histogram overlap," H3, from the original histogram, H1, entry by entry, to get at a final trimmed histogram, H4, may be represented by the following equation:

$$H4 = \max(0, (H1 - H3)) \quad \text{(Eqn. 2).}$$

The final step in FIG. 3 is Element 124, "Send 'Trimmed Histogram' (h4) values to white balance." At this point, the trimmed histogram, H4, may be fed to an AWB process 110' to calculate an estimated white point and color balance the image. The trimmed histogram H4 should have much less influence from the dominant colors that have overlap with the illuminant color region, and thus subsequent white point estimates are less prone to dominant color failure.

In some embodiments, histogram trimming may be limited to a local histogram region, i.e. a subset of the values comprising the histogram, in order to reduce computation and to reduce the risk of removing all available values in the histogram. For example, if the dominant color is in the greenish-yellowish range, histogram trimming may be performed only in the green/yellow zone of the histograms (e.g., the lower right region in the color spaces shown in FIGS. 5 and 6). This technique may be used to correct for white balance failure in scenes with large areas of foliage, which is common in consumer photography.

There are some scenes where the histogram trimming method may actually increase white balance error. These are typically scenes with artificial lighting (e.g., some very "greenish" illuminants, such as mercury vapor lights or low CRI compact fluorescent lights). The pixel response of white/gray surfaces under these lights may have almost identical histograms as foliage under some daylights. Histogram trimming for these scenes may actually end up removing the cluster of pixel values corresponding to white/gray, thus introducing a bias to white point estimate. Fortunately, these types of failures almost always occur in scenes with artificial lighting, and thus can be prevented if flicker information is used to distinguish artificial lighting scenes from scenes with natural lighting. Techniques to determine whether or not there is temporal flickering in a given scene are known to those of skill in the art. As such, the histogram trimming process described above can optionally be turned off when flicker is detected. Doing so has been found to eliminate almost all of the failure cases introduced by the histogram trimming process described above.

Figure 4:
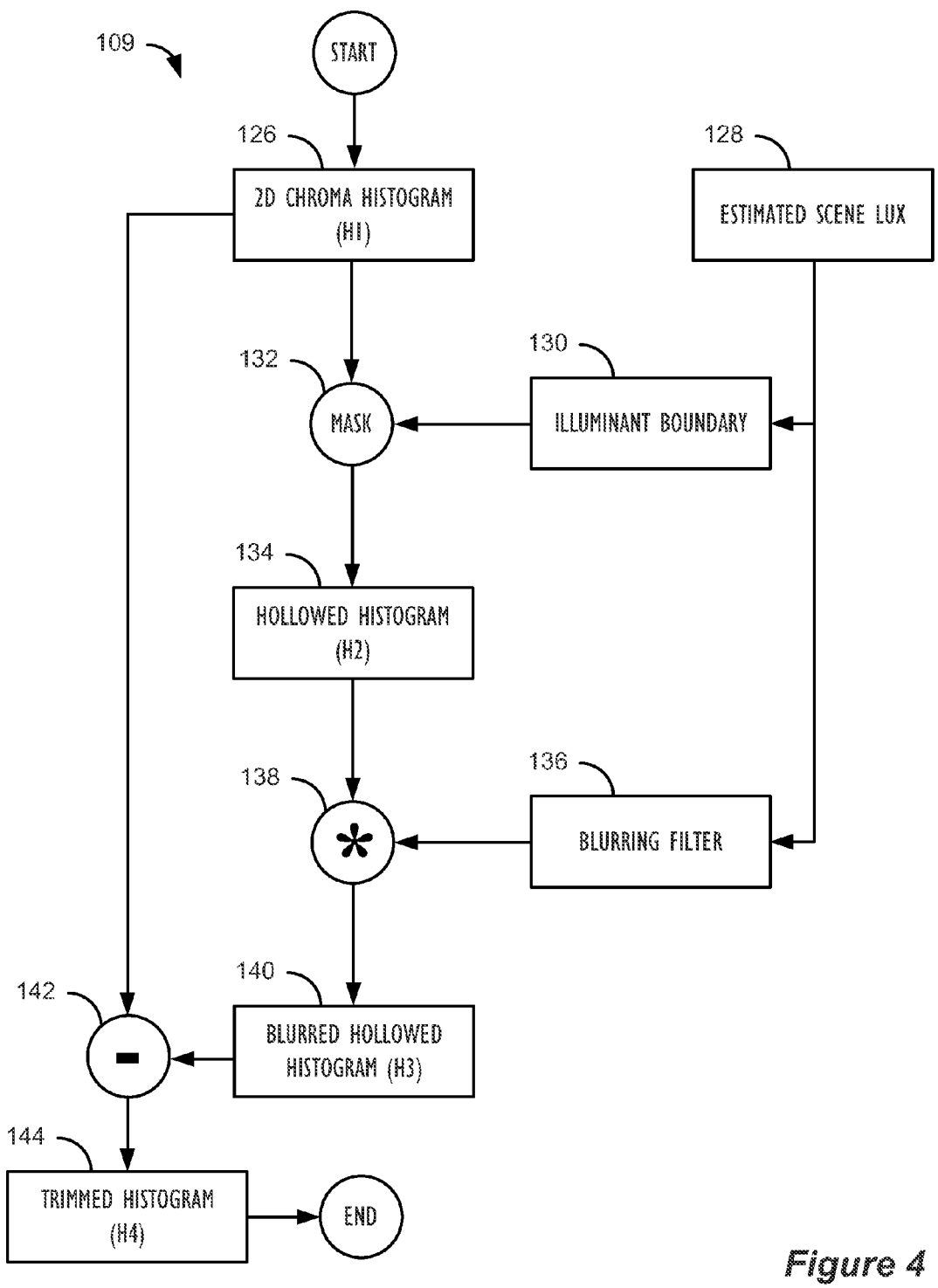
FIG. 4 illustrates, in flowchart form, a process for creating a trimmed image histogram, in accordance with one embodiment.

FIG. 4 illustrates, in flowchart form, greater detail regarding a process for creating a trimmed image histogram, in accordance with one embodiment. As described in reference to FIG. 3 above, the process begins by creating or receiving histogram H1 (Step 126). Concurrently or a priori, processes in communication with image sensor data may be used to estimate scene lux levels (Step 128). For reference, average indoor lighting ranges from 100 to 1,000 lux, and average outdoor sunlight is about 50,000 lux. By measuring scene lux, a likely lighting source type can be inferred, and a range of known possible white values for such a light source may be used to generate a more accurate illuminant boundary, e.g., a mask or polygon, for the color space (Step 130). For example, at low lux levels, the illuminant boundary will need to be relatively large, and at higher lux levels, the illuminant boundary may be relatively smaller, e.g., confined fairly closely to the daylight white area. The scene lux-informed illuminant boundary may be used at Step 132 to set all histogram values falling within such boundary to zero, resulting in the aforementioned "hollowed histogram," H2 (Step 134).

The blurring filter 136 may also be informed by the estimated scene lux level. Specifically, the values in the blurring filter may be determined at least in part by the noise profile of the image sensor at the estimated scene lux level. At Step 138, the hollowed histogram H2 is convolved with the blurring filter using matrix convolution, resulting in the aforementioned "blurred hollowed histogram," H3 (Step 140). Finally, the values in H3 are subtracted one by one from the values in original histogram H1 (Step 142), resulting in "trimmed histogram," H4 (Step 144). This process works on color histograms instead of image pixels, so computation costs do not increase with image size. It can also cope with scenes having large dominant areas of surface colors and only a small area of white surface—a situation where most AWB algorithms have great difficulty.

Applying the "Trimmed Histogram" in a 2D Color Space

Figure 5:
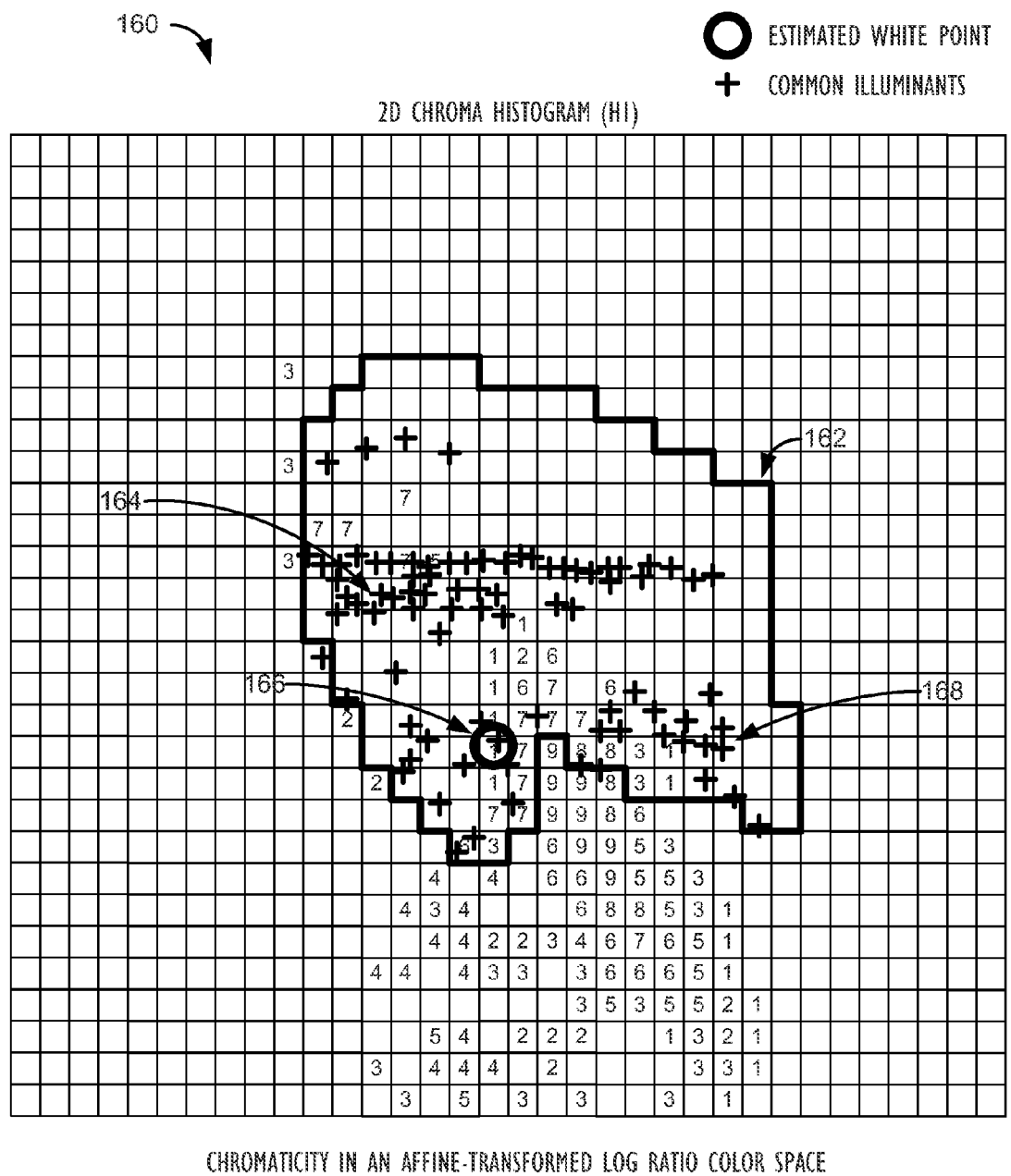
FIG. 5 illustrates a 2D image histogram plot in an affine transformed log ratio chromaticity space, along with a common illuminant mask, common illuminant white points, and an estimated image white point, in accordance with one embodiment.

Turning now to FIG. 5, a 2D image histogram plot 160 of an exemplary histogram H1 in an affine-transformed log ratio chromaticity space, along with a common illuminant mask 162, common illuminant white points 164, and an estimated image white point 166 are illustrated, in accordance with one embodiment. The numerical values in the 2D image histogram plot 160 represent the relative frequencies of pixels tabulated in the color space on a scale normalized from 1-9, with areas on the histogram not possessing a threshold number of pixels being left blank for clarity and convenience. The two axes of the plot 160 represent chromaticity in an affine-transformed log ratio color space. As mentioned above, the use of this particular color space in this example is merely explanatory, and the techniques described herein may be applied to any number of histogram-based AWB algorithms using a wide variety of different color spaces. The cross symbols on the plot represent color coordinates of known common illuminants. Note the heavy clusters of crosses at the lower portion of the mask 162, which represent "greenish" pixel responses, such as some fluorescent lighting, in this particular color space. From the concentration of larger numbers in the histogram plot near this "greenish" region, it may be inferred that this is a histogram from an image with a large number of greenish surfaces, some of which fall in the common illuminant zone. The mask 162 on the histogram represents the region of illuminant colors for this particular sensor at the particular scene lux and estimated noise level of the image. Pixel values within the mask 162 will actually be used to calculate white points. Even though only a portion of the pixel values from the greenish or yellowish surfaces overlap the zone of illuminant colors as shown in FIG. 5 (see some of the large numbers in the lower central region of the mask 162), they may be sufficient to bias the calculated white balance result 166 significantly. Indeed, as shown in FIG. 5, the estimated white point 166 on this untrimmed histogram is down near the "greenish" region on the plot.

Figure 6:
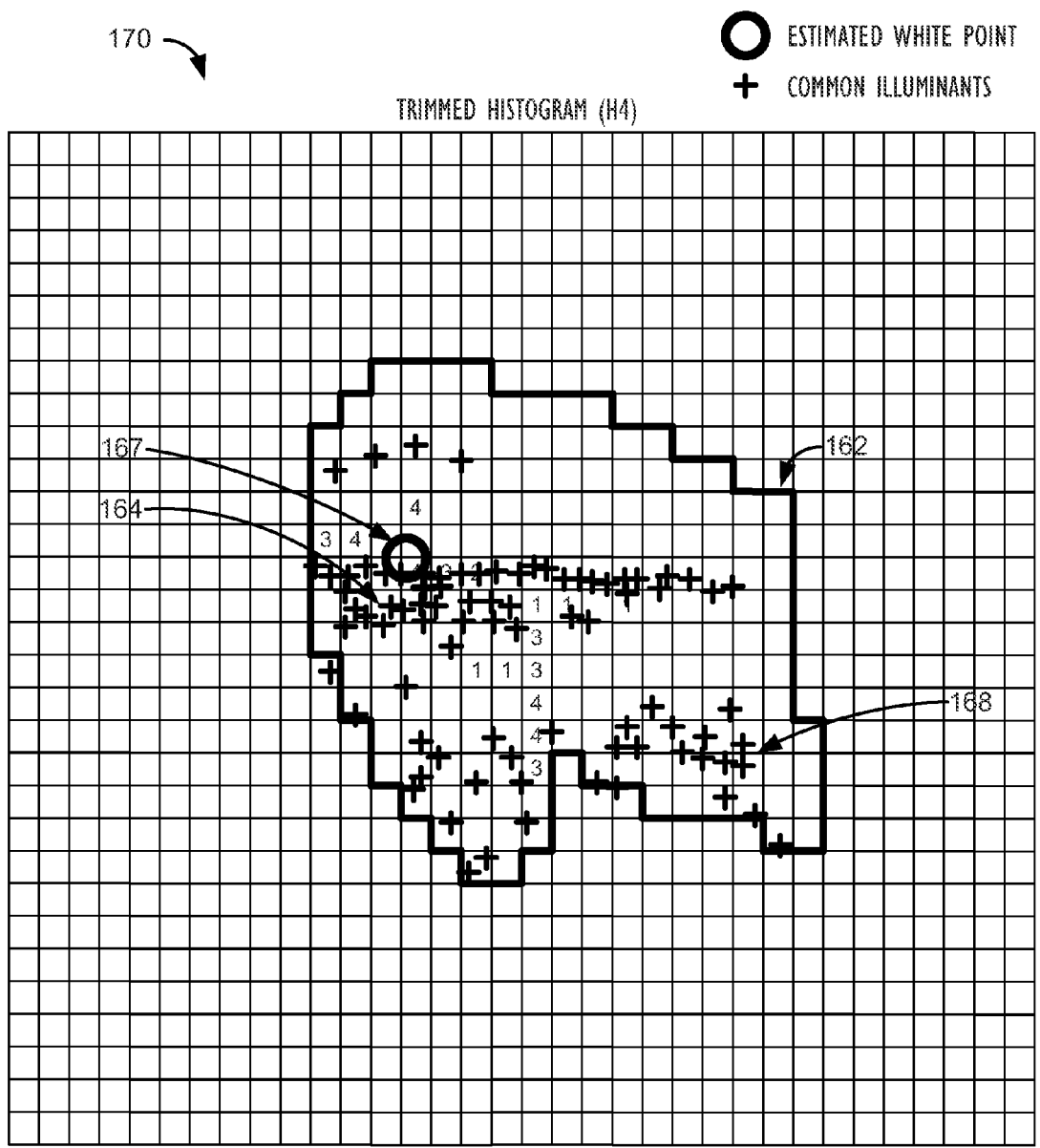
FIG. 6 illustrates a trimmed 2D image histogram plot in an affine transformed log ratio chromaticity space, along with a common illuminant mask, common illuminant white points, and an improved image white point estimate, in accordance with one embodiment.

Turning then to FIG. 6, a trimmed 2D image histogram plot 170 of an exemplary trimmed histogram H4 in an affine-transformed log ratio chromaticity space, along with a common illuminant mask 162, common illuminant white points 164, and an improved estimated image white point 167 are illustrated, in accordance with one embodiment. As may be seen when comparing FIGS. 5 and 6, pixel values falling outside common illuminant mask region 162 have been excluded (i.e., there are no numbers 1-9 in the boxes located outside mask 162), and even pixel frequency values within the common illuminant mask region 162 attributable to the dominant greenish color have been diminished or removed altogether via the application of the blurring filter convolution (Step 138 in FIG. 4). The remaining values in the histogram plot 170 may then be used to determine a more accurate scene white point and passed on to the desired AWB algorithm. In this case, as shown in FIG. 6, the application of a trimmed histogram has resulted in an improved estimated white point 167 that has been moved upwardly and significantly away from the "greenish" region where estimated white point 166 was calculated for the untrimmed histogram H1 in plot 160 of FIG. 5. This improved estimated white point 167 was calculated with little or no influence from the dominant greenish colors in the image that fell within the common illuminant boundary, and will likely provide a more accurate scene white point for color correction, i.e., one that will not cause the corrected image to be overly purplish.

The histogram trimming techniques outlined above provide a good estimate of the amount of influence the dominant color had on pixel values falling in the common illuminant range and allows us to exclude much of that dominant color's influence from the eventual white point calculation. As always, however, determining parameters for a process such as this can prove to be a constant empirical battle between removing too much color information from the common illuminant area and keeping too much information from colored surfaces in the final trimmed histogram. By adjusting the illuminant boundaries and filter kernel size and shape to a particular implementation and image sensor, however, vastly improved AWB results may be achieved, particularly in scenes with a dominant colored surface(s).

Figure 7:
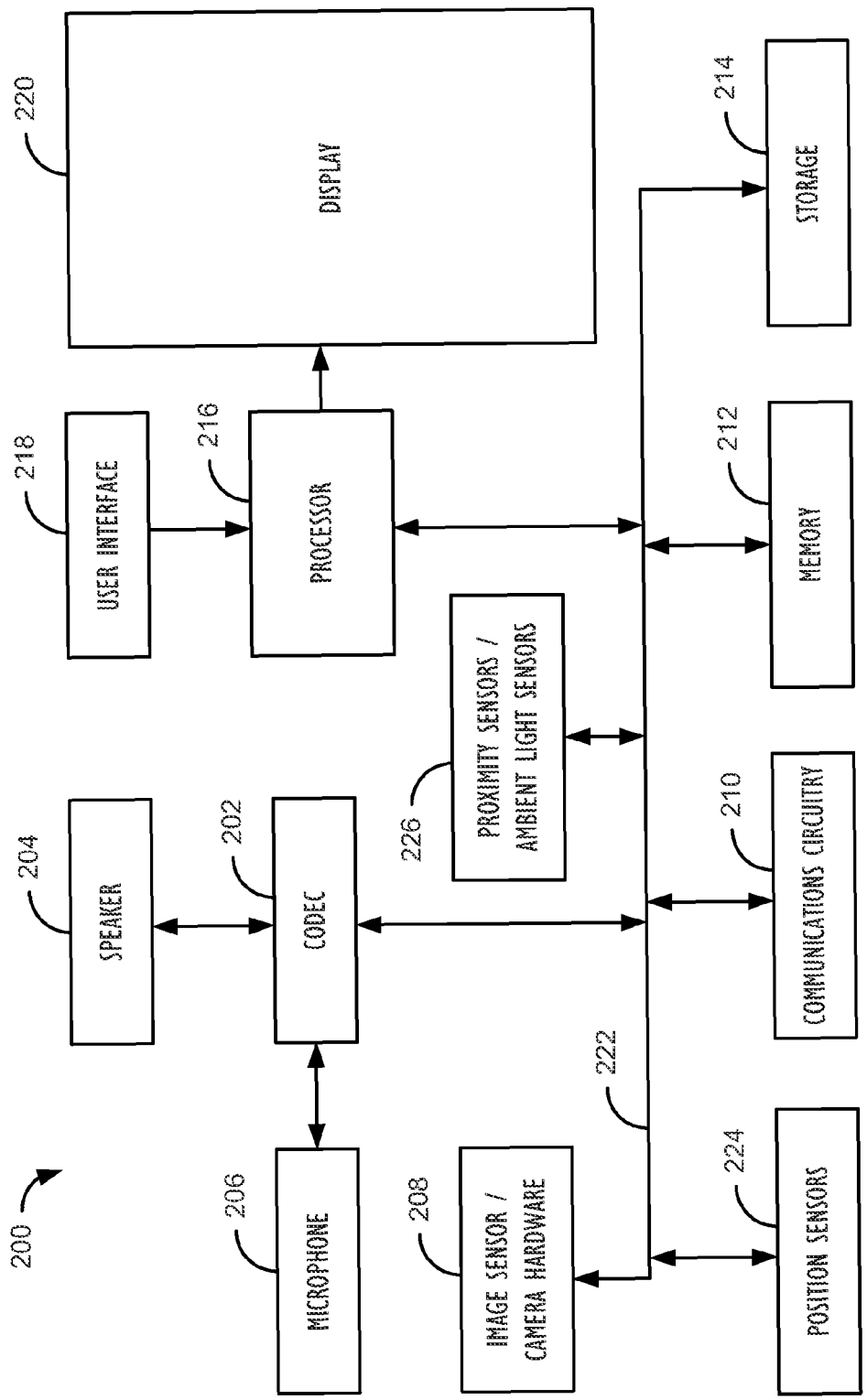
FIG. 7 illustrates a simplified functional block diagram of a representative electronic device possessing a display and an image sensor.

Referring now to FIG. 7, a simplified functional block diagram of a representative electronic device possessing a display 200 according to an illustrative embodiment, e.g., electronic image capture device 200, is shown. The electronic device 200 may include a processor 216, display 220, proximity sensor/ambient light sensor 226, microphone 206, audio/video codecs 202, speaker 204, communications circuitry 210, position sensors 224 (e.g., accelerometers or gyrometers), image sensor with associated camera hardware 208, user interface 218, memory 212, storage device 214, and communications bus 222. Processor 216 may be any suitable programmable control device and may control the operation of many functions, such as the processing of image data, as well as other functions performed by electronic device 200. Processor 216 may drive display 220 and may receive user inputs from the user interface 218. An embedded processor provides a versatile and robust programmable control device that may be utilized for carrying out the disclosed techniques.

Storage device 214 may store media (e.g., image and video files), software (e.g., for implementing various functions on device 200), preference information, device profile information, and any other suitable data. Storage device 214 may include one more storage mediums for tangibly recording image data and program instructions, including for example, a hard-drive, permanent memory such as ROM, semi-permanent memory such as RAM, or cache. Program instructions may comprise a software implementation encoded in any desired language (e.g., C or C++) and organized into one or more program modules.

Memory 212 may include one or more different types of memory which may be used for performing device functions. For example, memory 212 may include cache, ROM, and/or RAM. Communications bus 222 may provide a data transfer path for transferring data to, from, or between at least storage device 214, memory 212, and processor 216. User interface 218 may allow a user to interact with the electronic device 200. For example, the user input device 218 can take a variety of forms, such as a button, keypad, dial, a click wheel, or a touch screen.

In one embodiment, the personal electronic device 200 may be an electronic device capable of processing and displaying media, such as image and video files. For example, the personal electronic device 200 may be a device such as such a mobile phone, personal data assistant (PDA), portable music player, monitor, television, laptop, desktop, and tablet computer, or other suitable personal device.

The foregoing description of preferred and other embodiments is not intended to limit or restrict the scope or applicability of the inventive concepts conceived of by the Applicants. As one example, it will be appreciated that the teachings of the present disclosure can be applied to other implementations as well, such as traditional digital cameras. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A non-transitory program storage device, readable by a programmable control device comprising instructions stored thereon for causing the programmable control device to:
store image pixel data in a memory, wherein the image pixel data is obtained from an image sensor;
transform the image pixel data into a two-dimensional image histogram of values over a color space, wherein the values correspond to a distribution of the image pixel data in the color space, wherein each color in the color space has a noise distribution, and wherein the noise distribution of each color in the color space is x-y separable;

create a non-white histogram of values over the color space by identifying non-white pixel values in the image histogram;

create a blurred non-white histogram of values over the color space by blurring the non-white histogram;

subtract the blurred non-white histogram from the image histogram to create a trimmed histogram of values over the color space; and store the trimmed histogram of values in the memory.

2. The non-transitory program storage device of claim 1, further comprising instructions for causing the programmable control device to calculate a white point for the image pixel data in the color space based, at least in part, on the trimmed histogram.

3. The non-transitory program storage device of claim 1, wherein the instructions for causing the programmable control device to identify non-white pixel values in the image histogram comprise instructions for causing the programmable control device to use a mask.

4. The non-transitory program storage device of claim 1, wherein the instructions for causing the programmable control device to identify non-white pixel values in the image histogram comprise instructions for causing the programmable control device to use a mask representing a closed region.

5. The non-transitory program storage device of claim 1, wherein the instructions for causing the programmable control device to blur the non-white histogram comprise instructions for causing the programmable control device to convolve the non-white histogram with a filter kernel.

6. The non-transitory program storage device of claim 1, wherein the instructions for causing the programmable control device to create a non-white histogram and a blurred non-white histogram comprise instructions for causing the programmable control device to use a subset of the image histogram values.

7. The non-transitory program storage device of claim 1, further comprising instructions for causing the programmable control device to determine whether the image was illuminated by an artificial light source.

8. The non-transitory program storage device of claim 4, wherein the shape of the mask is determined at least in part by an estimated lux of the image.

9. The non-transitory program storage device of claim 5, wherein the instructions for causing the programmable control device to convolve the non-white histogram with a filter kernel comprise instructions for causing the programmable control device to use a filter kernel having a shape determined at least in part by an estimated noise level of the image.

10. The non-transitory program storage device of claim 7, further comprising instructions for causing the programmable control device to omit performing the instructions for causing the programmable control device to subtract when it is determined that the image was illuminated by an artificial light source.

11. An apparatus comprising:
an image sensor;
a programmable control device;
a memory coupled to the image sensor and the programmable control device, wherein instructions are stored in the memory, the instructions for causing the programmable control device to:
obtain image pixel data from an image captured by the image sensor;
transform the image pixel data into a two-dimensional image histogram of values over a color space, wherein the values correspond to a distribution of the image pixel data in the color space, wherein each color in the color space has a noise distribution, and wherein the noise distribution of each color in the color space is x-y separable;
create a non-white histogram of values over the color space by identifying pixel values in the image histogram falling outside a common illuminant color zone;
blur the non-white histogram to create a blurred non-white histogram of values over the color space; and
subtract the blurred non-white histogram from the image histogram to create a trimmed histogram of values over the color space.

12. The apparatus of claim 11, further comprising instructions for causing the programmable control device to send the trimmed histogram of values to an auto white balance (AWB) program module.

13. The apparatus of claim 11, further comprising instructions for causing the programmable control device to calculate a white point for the image pixel data in the color space based at least in part on the trimmed histogram of values.

14. The apparatus of claim 11, wherein the instructions for causing the programmable control device to identify pixel values in the image histogram falling outside a common illuminant color zone comprises using a mask.

15. The apparatus of claim 11, wherein the instructions for causing the programmable control device to blur the non-white histogram comprise instructions for causing the programmable control device to convolve the non-white histogram with a filter kernel.

16. The apparatus of claim 15, wherein the instructions for causing the programmable control device to convolve the non-white histogram with a filter kernel comprise instructions for causing the programmable control device to use a filter kernel having a shape that is determined at least in part by an estimated noise level of the image.

17. A non-transitory program storage device, readable by a programmable control device comprising instructions stored thereon for causing the programmable control device to:
store image pixel data in a memory, wherein the image pixel data is obtained from an image sensor;
transform the image pixel data into a two-dimensional image histogram of values over a color space, wherein the values correspond to a distribution of the image pixel data in the color space, wherein each color in the color space has a noise distribution, and wherein the noise distribution of each color in the color space is x-y separable;
create a non-white histogram of values over the color space by identifying non-white pixel values in the image histogram;
create a non-white influence histogram of values over the color space by estimating the influence of the non-white pixel values in the image histogram on white pixel values in the image histogram;
subtract the non-white influence histogram from the image histogram to create a trimmed histogram of values over the color space; and
store the trimmed histogram of values in the memory.

18. The non-transitory program storage device of claim 17, further comprising instructions for causing the programmable control device to calculate a white point for the image pixel data in the color space.

19. The non-transitory program storage device of claim 17, wherein the instructions for causing the programmable control device to estimate the influence of the non-white pixel values in the image histogram on the white pixel values in the image histogram comprise instructions for causing the programmable control device to convolve the non-white histogram with a filter kernel.

20. The non-transitory program storage device of claim 18, wherein the instructions for causing the programmable control device to calculate a white point further comprise instructions for causing the programmable control device to use the values of the trimmed histogram.

21. The non-transitory program storage device of claim 19, wherein the instructions for causing the programmable control device to convolve the non-white histogram with a filter kernel comprise instructions for causing the programmable control device to use a filter kernel whose shape is determined at least in part by an estimated noise level of the image.

22. A non-transitory program storage device, readable by a programmable control device comprising instructions stored thereon for causing the programmable control device to:
  store a two-dimensional image histogram of values over a color space in a memory, wherein the values correspond to a distribution of image pixel data in the color space, wherein each color in the color space has a noise distribution, wherein the noise distribution of each color in the color space is x-y separable, and wherein the image pixel data is obtained from an image sensor;
  create a non-white histogram of values over the color space by identifying non-white pixel values in the image histogram;
  create a blurred non-white histogram of values over the color space by blurring the non-white histogram;
  subtract the blurred non-white histogram from the image histogram to create a trimmed histogram of values over the color space; and
  store the trimmed histogram of values in the memory.

23. The non-transitory program storage device of claim 22, further comprising instructions causing the programmable control device to calculate a white point for the image pixel data in the color space based, at least in part, on the values of the trimmed histogram.

* * * * *